United States Patent [19]

Bolza-Schunemann et al.

[11] Patent Number: 5,384,859
[45] Date of Patent: Jan. 24, 1995

[54] METHOD FOR QUALITY CONTROL OF PRINTED SHEETS

[75] Inventors: Claus A. Bolza-Schunemann; Johannes G. Schaede, both of Wurzburg, Germany

[73] Assignee: Koenig & Bauer, Akteingesellschaft, Wurzburg, Germany

[21] Appl. No.: 926,699

[22] Filed: Aug. 10, 1992

[30] Foreign Application Priority Data

Aug. 12, 1991 [DE] Germany .............................. 4126582
Dec. 20, 1991 [DE] Germany .............................. 4142481

[51] Int. Cl.⁶ .............................................. G06K 9/36
[52] U.S. Cl. ........................................ 382/1; 356/394; 364/552; 382/50; 382/57
[58] Field of Search .............. 382/1, 57, 50; 356/389, 356/394, 404, 237; 364/552

[56] References Cited

FOREIGN PATENT DOCUMENTS 0159880 12/1985 European Pat. Off. .
0194331 9/1986 European Pat. Off. .

OTHER PUBLICATIONS

"Image Analysis Algorithm for Detection Defects in Repetitive Patterns" vol. 24, No. 85, Apr. 1991, Havant GB.

Sobey et al., "Detection and Sizing Visual Features in Wood Using Total Measures and a Classification Algorithm", vol. 22, No. 4, 1989 Elmsford, N.Y. US.

Patent Abstract of Japan, JP60124783, Meidensha KK, "Picture Processing Unit", Nov. 12, 1985.

Patent Abstract of Japan, JP2252392, Ricoh Co. Ltd., "Picture Quality Evaluating Method", Dec. 12, 1990.

Primary Examiner—Leo H. Boudreau
Attorney, Agent, or Firm—Jones, Tullar & Cooper

[57] ABSTRACT

Individual printed image elements from an image to be inspected are allotted individual nominal ink density values, as by scanning an ideal printed sheet by a CCD matrix camera. The ideal values are stored in a main memory having segments for average, or grey, values for each image element. A multiplicity of proof images are scanned, and their density values measured and stored for each proof judged acceptable by an inspector. Thereafter, the variations in the acceptable proof density values are stored in the main memory as maximum and minimum acceptable deviations from the initial nominal values for each individual image element to provide a subjective tolerance value for the nominal density values in the main memory.

18 Claims, 6 Drawing Sheets

FIG. 1
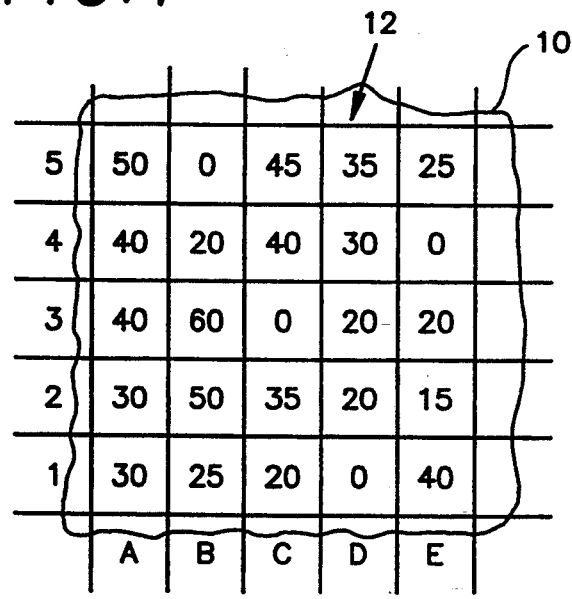
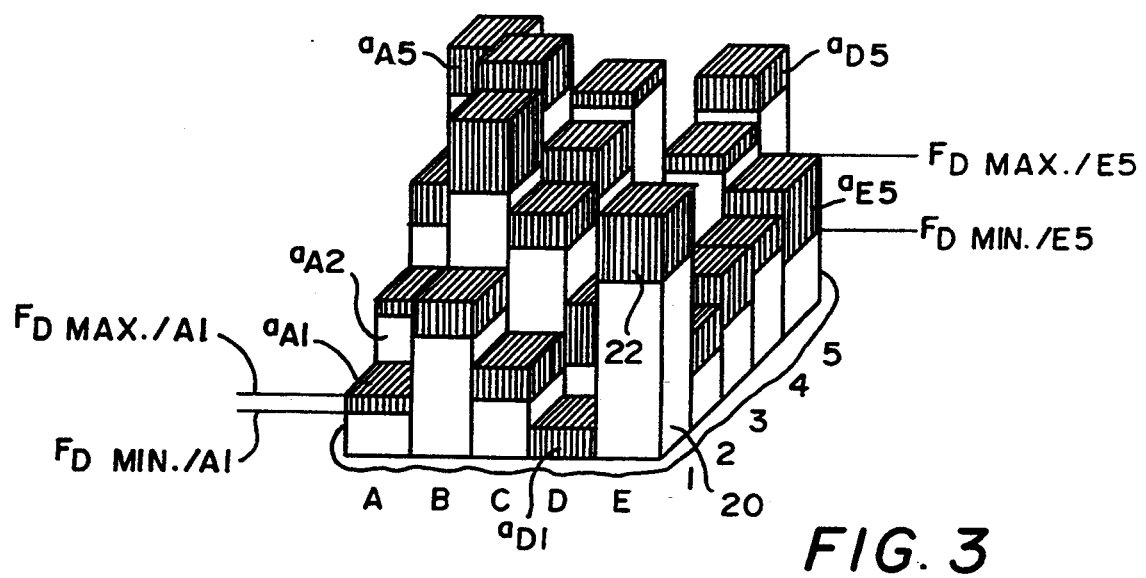
FIG. 3

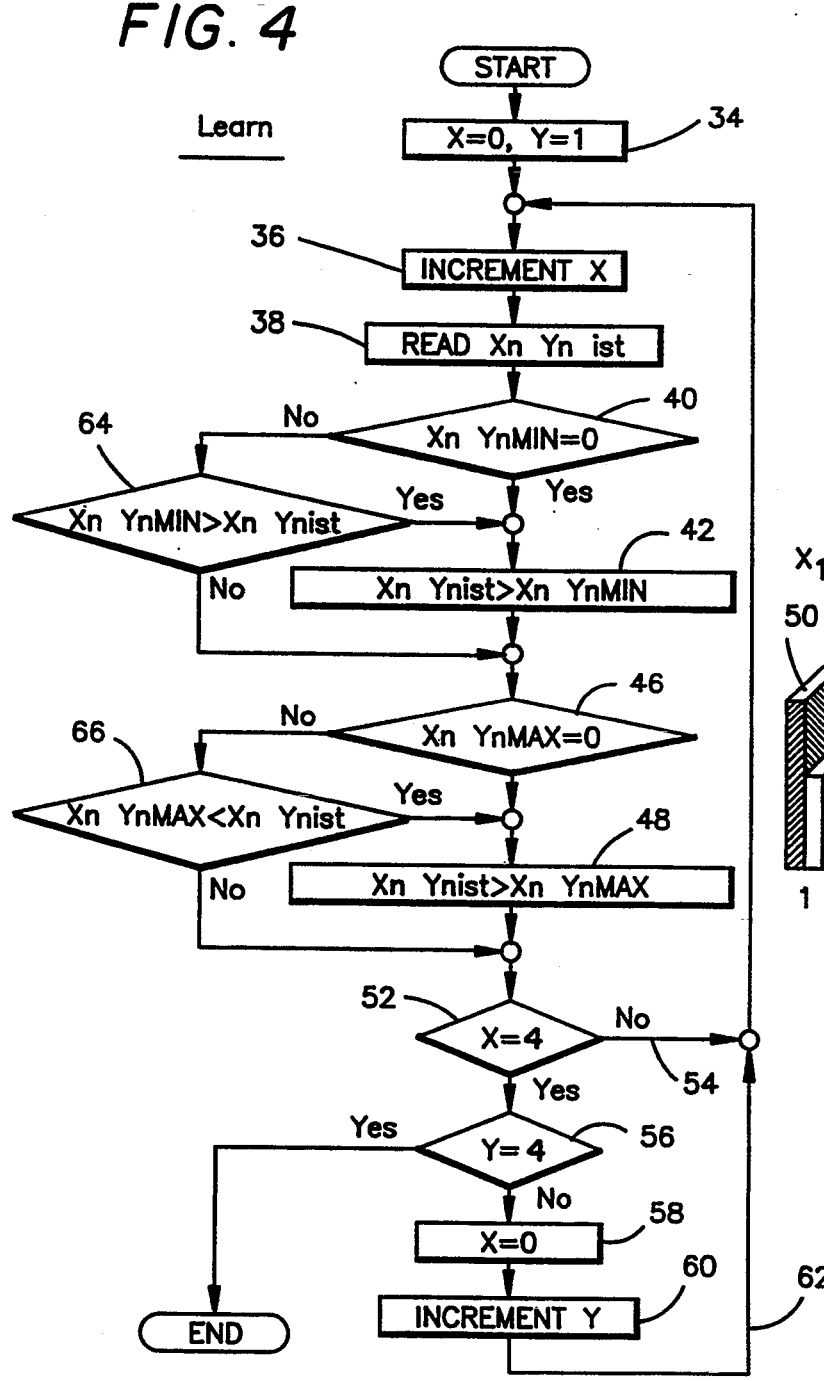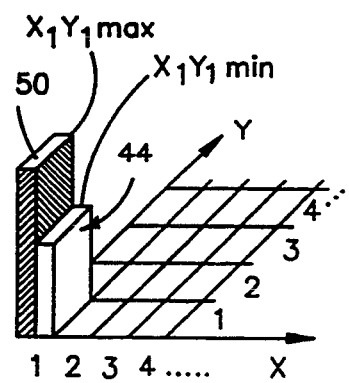

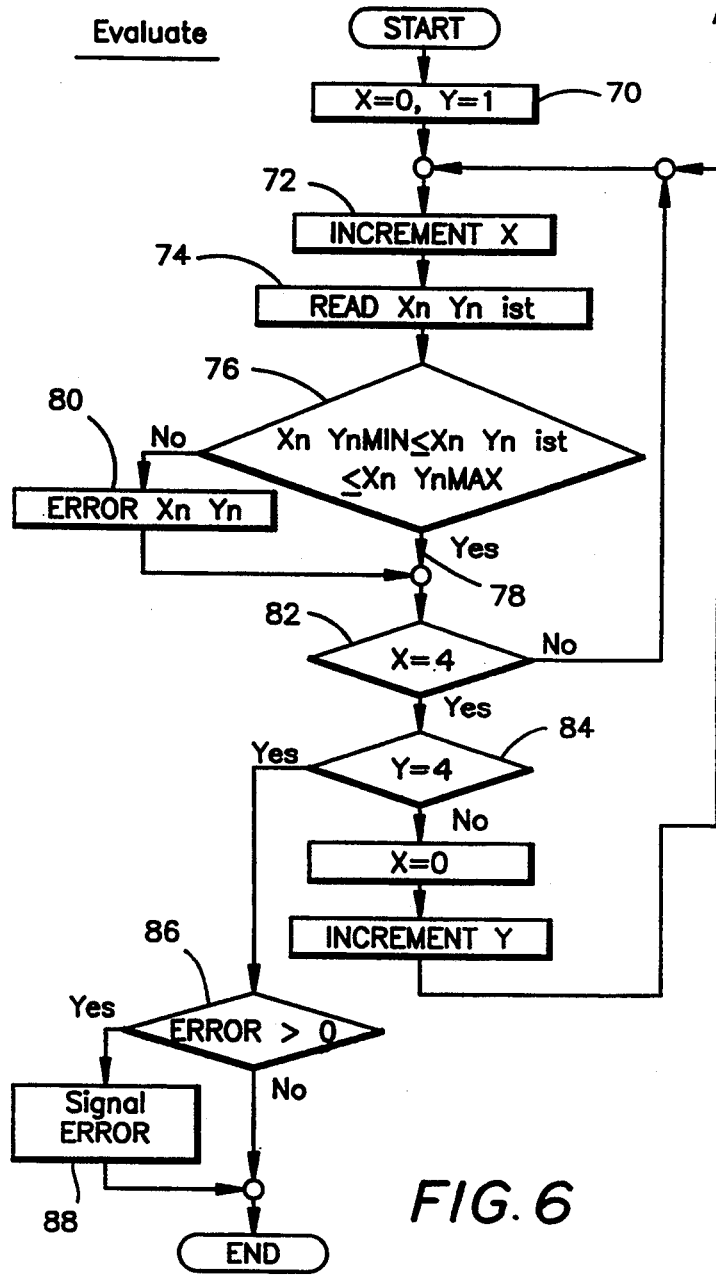

GREY VALUE TOLERANCE
(A-A)

GREY VALUE TOLERANCE
(B-B)

METHOD FOR QUALITY CONTROL OF PRINTED SHEETS

BACKGROUND OF THE INVENTION

The present invention relates, in general, to a procedure for judging the quality of printed sheets. More particularly, the invention relates to a method for judging the quality of printed images on a printing carrier, such as paper, wherein a master image is obtained by first electronically scanning a master printed sheet to determine an average grey value for each of a number of image elements, and thereafter scanning a multiplicity of proof sheets that have been judged to be acceptable by a human inspector to establish a subjective tolerance range. Subsequently, printed sheets are electronically reviewed and the grey values for selected image elements are compared with the stored values for those elements. Sheets with grey values within the allowable tolerance ranges are judged acceptable, while those with values outside the master tolerance ranges are rejected.

Devices for judging the quality of printed sheets or proof copies, are generally known; see, for example, European published unexamined patent application No. 0194331. In general, the checking of print quality refers to the measuring of ink density values in measuring fields or areas selected for that purpose. Register deviations are checked by measuring special register faults and contrast marks for analyzing dot increases and contrast. Initially, these quality control checks could not be carried out over an entire printed sheet, but systems became available on the market which permitted such monitoring with the help of image exposure devices which projected a printed sheet or a section of a printed sheet as a standing image on a monitor. Such standing images were stored in an image memory so that the printer could look at a selected still image of a printed sheet and could control the printed product on-line. Once it was known to do this, it became possible to compare later images derived from the printed products with the stored initial image and to produce signals representing any deviations, and such systems are now known.

However, it has been found such image comparison systems can result in excessive losses, for such systems operate to produce error signals whenever an image element comparison exceeds a predetermined error limit, represented by a defined difference between nominal and actual values. Such a rigid system of detecting errors is unusable in practice, since an exact correspondence of individual image elements between the "master" image and a printed image cannot be guaranteed during a printing run because of a variety of factors such as deformation of the print carrier, and the like. For example, in intaglio printing a line on the image to be judged may move with respect to its nominal position on the printing carrier, which may be a sheet or web, from one copy to the next during a production run. Such displacements of printed image elements can cause error signals in an automatic system, even though the differences between the master image and the sample image are small, and would be judged to be acceptable by an inspector. Another example is the measurement of ink density in a sample, where the average density, or grey value, of the image within a designated region, or image element, is measured. The grey value may vary from a nominal value by an amount which would produce an error signal in an automatic system, but which would be acceptable for an inspector.

A difficulty with prior automatic image comparison systems, therefore, is that they may reject printed images in cases where an inspector might consider the differences to be insufficient to cause an error signal. Tests have shown that visual examination of a printed image for the detection of printing errors is very subjective. When examining homogeneous surfaces; for example, unprinted sections, the human eye acts with the highest sensitivity to detect errors, and in such a situation, the slightest irregularities will be recognized immediately. On the other hand, the same irregularities within a printed section may not be recognized by a human inspector. However, both irregularities would cause an automatic inspection system to reject the printed image. Thus, there are significant limits to the use of automatic error detection systems for measuring irregularities in a printed product.

BRIEF SUMMARY OF THE INVENTION

It is, therefore, an object of the present invention to provide a procedure for controlling printed sheets in which quality control is obtained by an opto-electronic system and wherein the results of such control are substantially identical to the results that would be obtained by a trained human inspector.

It is another object of the invention to utilize the properties of the human eye and brain for subjective error detection to the greatest degree possible for image comparison quality control.

A still further object of the invention is to provide a procedure for judging the quality of a printed image by establishing nominal values for the location of images as well as ink density within the images, and for establishing subjective tolerances for such nominal values.

In accordance with the invention, a master image having specified density values for individual image elements (pixels) is identified and each element is allocated an individual, subjective error tolerance in an inventory manner. Such allowable errors may be visualized as a graphical display in three dimensions by "error mountains" of the type described in copending application Ser. No. 925,273 of Claus August Bolza Schunemann et al, filed on even date herewith and entitled "Method for Judging Printed Sheets", now U.S. Pat. No. 5,317,390. These pixel values can then be used as the basis for judging the quality of a printed image automatically, with the result that the number of trained inspectors required to inspect a product can be greatly reduced, without reducing the quality of the printed material being produced. Furthermore, inspectors will be relieved from the very demanding task of inspecting individual sheets of printed material, which inspection must be interrupted repeatedly by breaks to allow the inspectors to rest. Furthermore, in accordance with the invention, allowable register deviations as well as other deviations such as ink density are measured during such quality control, in a procedure for both web-fed and sheet-fed rotary printing presses. The system allows the capacity of the human eye and brain to make error judgments to be utilized for image comparison and quality control.

Briefly, in accordance with the present invention, individual image elements, which may consist of one or more pixels, are defined for the regions of a printed image which are to be inspected. Each individual element encompasses a pattern which corresponds to variations in ink density within the image element and these variations correspond to the shape of the image within the boundaries of the image element. This pattern may be derived, for example, from a master image to which the printed image sheets are to be compared, and this master pattern is stored, for each element, as Z values in a corresponding master image location in a suitable memory, at specified X and Y coordinates.

After the master pattern is stored in the memory, each image element is provided with a tolerance range which defines acceptable limits for the image carried by an image sheet being inspected. These tolerance ranges for the various individual image elements are individually selected and can be obtained, for example, by scanning a multitude of printed proof images which have been judged by a trained inspector to be acceptable, even though they might have register or density errors. The values of these acceptable printed proof sheets are stored in the corresponding memory locations to provide minimum and maximum allowable tolerance values for the nominal values obtained from the master image, and these tolerance values then provide a basis for judging future printed images.

In accordance with the present invention, the master image pattern is based on not only the presence or absence of a contrast intensive printed line such as an intaglio line, but is also based on the density of the ink in the printed line. The invention also provides a tolerance range for the position of the printed image within the individual image element; i.e., the image registration, and provides a tolerance range for the ink density within the image element.

The tolerance value for image registration is determined by establishing a range of image locations within an image element that is acceptable to an individual inspector. Then, an average value for the image intensity throughout the individual image element (pixel) is determined to provided an average "grey" value over the element. This average grey value will be obtained for that image element whenever the desired image is present within the defined range of locations. Thus, if no image appears within the selected region, the average grey value will be below a threshold level to indicate an unacceptable image registration. Similarly, variations in ink density may occur in the printed image which will affect the magnitude of the grey value so that if the ink density is too high or too low, even when the image is present in the image element (or pixel) the average grey value will be outside the acceptable tolerance range to provide an indication of an unacceptable image. A detected grey value within a predetermined tolerance range will, therefore, indicate both the presence of an image (registration) and an acceptable ink density in the image to thereby permit automatic determination of the quality of the printed image.

The nominal, or master, values can be obtained by scanning an "ideal" printed sheet, for example, by means of a CCD-matrix or single line camera, with the master values being recorded or stored in corresponding memory elements. Thereafter, the allowable tolerance range for each image element is determined by scanning printed proof sheets which have been determined to be acceptable, and the density values of these acceptable sheets are also stored in corresponding memory elements to provide the acceptable variation in the grey value. By this procedure, tolerance values are obtained not only for register errors, but for density errors.

A basic advantage produced by reason of the present procedure is that a very flexible and subjective determination of allowable tolerance values can be obtained not only for register errors but for density errors for contrast intensive lines within individual image elements, thereby eliminating the need for perfect alignment of a master image stored in the image memory with the X Y coordinates of an image to be measured. This allows flexibility in the analysis of characteristics of printed images or printed sheets to be analyzed for quality control. Such analysis involves comparison of an image at one or more pixels with corresponding image values stored in memory. Image elements having values which are outside the allowable tolerance field are identified by error signals having X-Y coordinates corresponding to the location of the elements in which the error occurs. Such error signals may be indicated in bright color on a monitor. In addition, or alternatively, sheets having images which are outside the tolerance values may be identified by means of a marking device; for example, an ink-jet printing device which marks the sheet or marks the position on the sheet at which the error occurs. The present process provides a high degree of error sensitivity, with the error measurements being independent of absolute ink density but dependent on density tolerances within individual elements while allowing register deviations within tolerance by measuring average, or grey values.

BRIEF DESCRIPTION OF THE DRAWINGS

The foregoing and additional objects, features and advantages of the present invention will become apparent from the following detailed description of a preferred embodiment thereof, taken in conjunction with the accompanying drawings, in which:

FIG. 1 represents an exemplary nominal ink density distribution in percent for a section of a printed sheet with a multitude of image elements A1 through E5;

FIG. 3 is a graphical representation of a three dimensional master image showing nominal and tolerance values for each of the image elements of FIG. 1;

FIG. 4 is a process diagram illustrating the procedure for determining nominal and tolerance values for a master image;

FIG. 5 is a graphical representation of a master image having maximum and minimum values;

FIG. 6 is a process diagram illustrating the procedure for evaluating a printed product to be inspected;

FIGS. 7 and 8 represent maximum and minimum ink density distributions for a plurality of proof images;

FIG. 9 is a diagram of an actual ink density distribution in a printed image to be evaluated;

FIG. 10 is a graphical representation of errors derived from a comparison of the FIG. 9 distribution with those of FIGS. 7 and 8;

DESCRIPTION OF PREFERRED EMBODIMENTS

Figure 2:
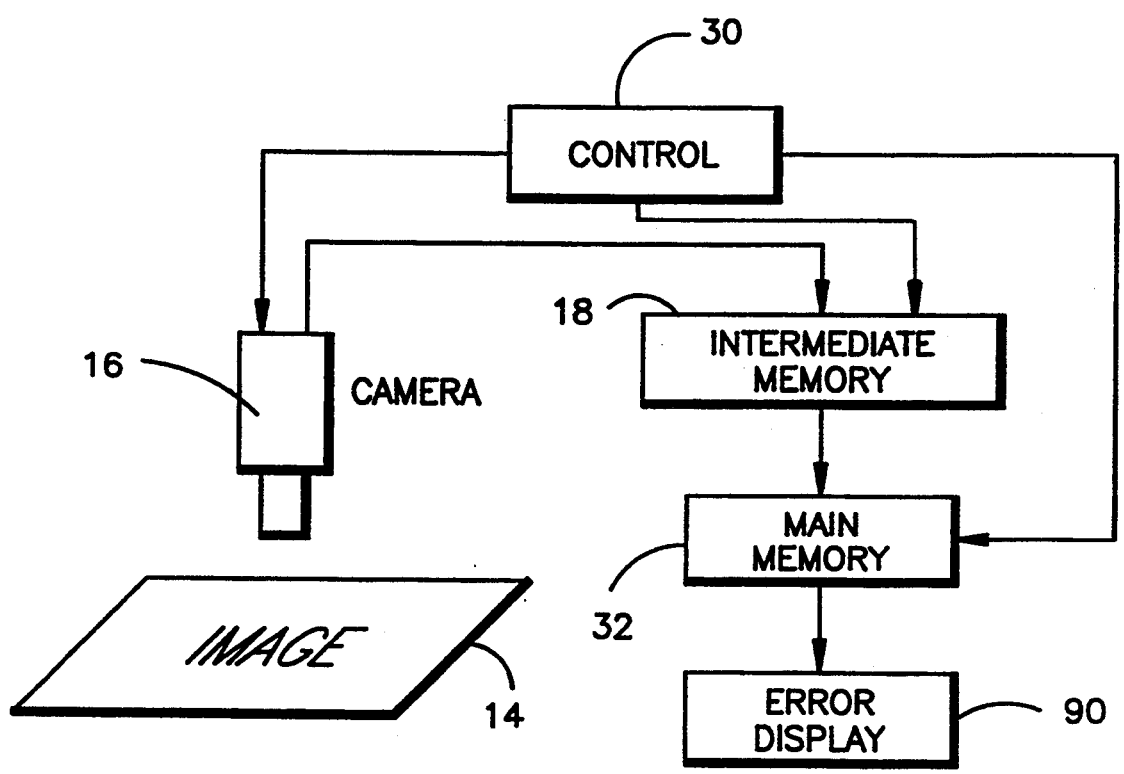
FIG. 2 is a diagram of an optical system for determining nominal and tolerance values for printed images.

As illustrated in FIG. 1, a segment 10 of a printed image on a printing carrier, for example paper, may, for purposes of control, be divided into a plurality of image elements, or pixels arranged in rows and columns of a matrix 12. For convenience, the pixels are arranged in columns A through E along an X axis and in rows 1 through 5 along a Y axis in the exemplary image segment 10, with the individual image elements thus being identifiable as elements A1 through E5. An exemplary nominal ink density distribution in percent is illustrated for the image elements A1 through E5 in FIG. 1. These nominal values could, for example, be determined by scanning an "ideal" printed sheet 14 (FIG. 2) by means of a CCD-matrix or single line camera 16, in known manner. The ink density values measured for each image element are recorded and stored in a suitable intermediate memory 18. The exemplary nominal density distribution indicated numerically in FIG. 1 is illustrated graphically in FIG. 3 in columnar form.

Although each of the image elements is initially assigned an ideal or master ink density value, it is known that these values change continuously during the printing process due, for example, to factors such as ink register variations. Thus, the actual printed ink density having a nominal value $F_D$ for an image element such as A1 will, in reality, usually deviate from the nominal value which is shown in FIG. 1 as being 30%. Similarly, the ink density values $F_D$ of 40% and 20% for the image elements A4 and B4, respectively, may vary. For example, these latter elements may have values of 35% and 25%, respectively, due to outside influences.

If an automatic inspection system permits ink density value variations for all of the image elements A1 to A5 to have only the same predetermined tolerance range so that the printed sheets are evaluated for uniform tolerance values, then sheets often will be rejected as being unacceptable which a trained inspector, during subjective consideration of the sheets, might judge as being acceptable.

Such a result can be avoided, in accordance with the present invention, by establishing an allowable tolerance range for each individual image element by taking an inventory of a large number of printed sheets (for example, proof sheets) which are judged subjectively to be acceptable and establishing an allowable tolerance range for each image element. In this way, a minimum and a maximum value of ink density is determined for each individual element from A1 to A5, as illustrated in the three-dimensional graph of FIG. 3. In this Figure, the nominal value is shown for each image element by the unshaded portion of the column; for example, portion 20 of column E1, with the allowable tolerance being indicated by the shaded portion; for example, portion 22 of column E1. In this way, a tolerance range a is established for each image element A1 to E5 which is coordinated with the nominal value of the respective image element. Instead of having a uniform tolerance variation for each element, the individual elements are assigned specific acceptable ranges. Thus, for example, for image element A1, a tolerance range $A1_a$ of 10% may be provided, while for image element E5, a tolerance range $E5_a$ of 100% may be allowable. The tolerance range is determined by the following:

$$\frac{F_{DMAX} - F_{DMIN}}{F_{DMIN}} = a$$

where $F_{DMAX}$ is the maximum allowable ink density value, $F_{DMIN}$ is the minimum allowable ink density value and a is the tolerance range.

The establishment of an individual allowable ink density deviation tolerance allocation for each of the individual image elements A1 to E5 enables an optimal automatic quality control of printed sheets and avoids discarding printed sheets which might not meet a rigidly uniform tolerance value but which would meet the subjective standard of a trained inspector. The practical result of the process of establishing individual tolerance allocations, or ranges, is illustrated in FIG. 3, where each of the exemplary image elements A1 through E5 has an individually determined ink density deviation tolerance $A1_a$ through $E5_a$ of its own, as described above. This tolerance variation is established at the beginning of each new print job for a selected number of image elements which are to serve as the control for the particular print job.

In practice, the individual allowable ink density deviation tolerance value a may be evaluated in a simple way, as follows. After nominal values for each of the image elements are established in a main memory from a master image, a trained inspector commands the camera 16, for example through control 30, to scan a multitude of printed proof sheets 14 successively. Ink density values obtained for each image element of each printed sheet 14 are stored in intermediate memory 18. An identification number is provided on each printed sheet by means of a marking device, and that identification number is also stored in memory 18 with its corresponding image element information.

Thereafter, the numbered image sheets, or proof sheets, are subjected to a visual review by an inspector who decides whether each sheet is acceptable or not. The ink density values for any unacceptable proof sheets are deleted from the memory 18. A command is then given to relocate the ink density values $F_D$ for image elements A1 through E5 for each of the acceptable proof sheets from the intermediate memory 18 to the main memory 32. To the extent that these relocated values for each pixel differ from the nominal values in the main memory, the nominal values are modified by provide the tolerance values indicated by the shaded regions 22 in FIG. 3. A program operating in accordance with the flow diagram of FIG. 4 enables the memory 32 to learn the acceptable range of ink density values for image elements from A1 to E5 for the acceptable proof sheets. Accordingly, these values are transferred into the main memory as subjective tolerance ranges. As indicated in FIG. 4, the image elements, or pixels, of the printed product to be inspected are addressed in X- and Y-coordinates, the X coordinates corresponding to the columns A through E and the Y coordinates corresponding to the rows 1 through 5 of FIG. 1. Initially, the value of X is equal to zero and the value of Y is equal to one, as indicated in box 34 of FIG. 4.

To initially enter the nominal values established by the "ideal" or master image into the main memory, the X-coordinate is incremented as indicated at box 36 and the main memory at image element A1 (X=1, Y=1) is read, as indicated at box 38. The main memory 32 has two sections for each image element, one for a maximum value and one for a minimum value, to provide the tolerance range of the present invention, as illustrated in FIG. 5. Initially, both values are zero. As indicated at box 40, the first value read is the minimum, and since this initially is zero, the value of the master image from intermediate memory 18 is entered for the minimum value, as indicated at box 42, at coordinate $X_1$, $Y_1$, and indicated by col. 44 in FIG. 5.

Thereafter, the maximum value in image element $X_1$ $Y_1$ of the main memory 32 is read, as indicated at box 46, and since that value initially is zero, the master image value from intermediate memory 18 is transferred into the main memory, as indicated at box 48. This value is illustrated in FIG. 5 by column 50, and for the ideal image usually will be the same as the entered minimum value. The program determines whether all of the master image values for the Y=1 coordinates have been entered, as indicated at box 52, and if not, the loop is repeated as indicated by line 54. If all of the column entries for row 1 have been completed, then the program determines whether all of the rows have been transferred, at box 56, and if not, the value of X is returned to zero at box 58, the Y coordinate is incremented at box 60 and the loop is repeated by way of line 62. After the initial values for all of the image elements A1 through E5 have been stored in the main memory 32, the program ends.

Although the master, or ideal, image values initially transferred to memory 32 normally will include only a single nominal value for each image element, and will not have maximum or minimum values, nevertheless it may be desirable in some cases to establish a nominal tolerance range by entering maximum and minimum values in main memory 32.

Thereafter, detected density values from the proof sheets judged acceptable which have been stored in the intermediate memory 18 are transferred to the main memory using the same program. However, in this case, a determination is made for each image element as to whether the acceptable value is less than the minimum value already stored in the corresponding element for main memory 32, as at box 64 or is greater than the maximum value in memory 32, as at box 66, and if so, the proof values are substituted for the minimum and maximum values already in the main memory. This is repeated for each of the acceptable proof sheets and for each pixel, and in this way, the minimum and maximum acceptable tolerance values obtained from the multiplicity of proof copies are written over the values established initially in the main memory 32 to provide tolerance values for images to be printed. Since the new maximum and minimum ink density values for each image element are provided from the multiplicity of proof sheets judged acceptable by an inspector, these new values constitute subjective tolerance ranges which will substantially duplicate a human inspector's review of image elements on printed sheets being evaluated.

The new values inserted in the main memory 32 are used for automatic opto-electronic analysis and quality control of future printed sheets containing the same image. The quality control system uses these new values to determine whether a printed image is considered to be acceptable or not acceptable, and gives commands to conventional electronic controllers which transfer the acceptable and non-acceptable commands into control commands for activating, for example, diverters for diverting unacceptable printed images to a waste pile or for activating a suitable marking device for identifying unacceptable images. This comparison process is illustrated in the flow diagram of FIG. 6, the exemplary image element charts of FIGS. 7-9, and the error chart of FIG. 10.

As illustrated in FIG. 6, the evaluation process starts at coordinates X=0, Y=1, as indicated at box 70, the X coordinate is incremented at box 72. The stored density value at coordinate X1, Y1 for the image being evaluated is read at box 74. FIG. 7 indicates the maximum values stored in the main memory 32 for acceptable sheets, while FIG. 8 illustrates the minimum values stored in the same locations for an acceptable sheet. FIG. 9 illustrates the actual value of the printed image being evaluated, which values are read at box 74. Thus, for example, the density value at X1, Y1 may have a maximum value of 15% (FIG. 7), may have a minimum value of 9% (FIG. 8), and in an exemplary image to be evaluated, may have an actual value of 12% (FIG. 9). This comparison is carried out in box 76 of FIG. 6 and since the value 12% falls within the maximum and minimum values of FIGS. 7 and 8, an output is provided on line 78 indicating this fact, and no error appears in the location X1, Y1 of FIG. 10. If the actual value did not fall between the maximum and minimum values, the error would be detected at box 80, and this would be indicated on the chart of FIG. 10, and displayed for example on a monitor 90 (FIG. 2). The error signal may also be used to mark the sheet being inspected at the location of the error.

The comparison process is incremented through each of the positions in the X coordinate in box 82 and each of the positions in the Y coordinate in box 84, as discussed with respect to FIG. 4, and when all of the image elements have been compared with the values in the main memory, a determination is made as to whether there has been an error, at box 86. If so, an error signal is generated at box 88 so that the sheet being inspected can be marked or discarded.

Figure 11:
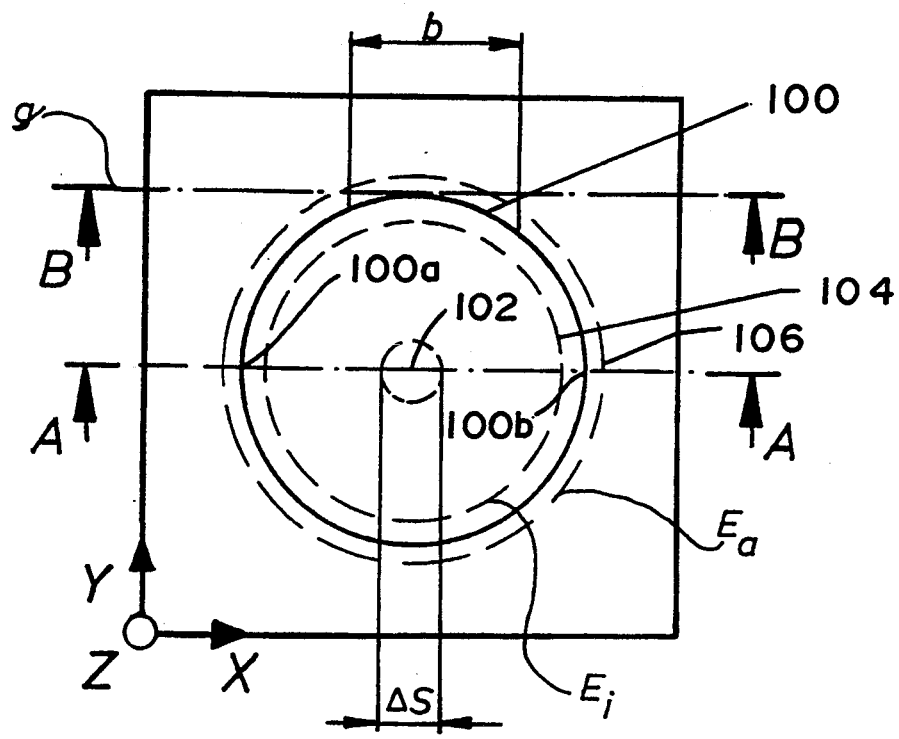
FIG. 11 is a diagrammatic illustration of the tolerances for a high contrast line such as an intaglio line.

The foregoing principles of obtaining subjective tolerance values for automatic judging of the quality of printed sheets are further illustrated in FIGS. 11-14, to which reference is now made. As illustrated in FIG. 11, a printed sample such as a circle 100 is to be judged for quality. In the past, for such an image to be accurately judged for ink density it was imperative to position each of the image elements accurately with respect to the X-Y coordinates of the corresponding master image elements in the main memory 32 image, for even a small displacement of the proof image could cause a large deviation from the nominal value, and result in error signals, even for deficiencies the human eye cannot detect. This was a typical problem with intaglio printing.

In order to judge the quality of images such as a line or the circle 100 in the present invention, not only is the ink density measured, as described above, but the registration of the image being judged must be extremely accurate for the printing quality statement. In intaglio printing, the printed line or circle to be judged often will not exactly remain in the nominal position on the printing carrier during a production run, and such movement can result in waste copies unless a range of tolerance for acceptable copies is provided for registration, as well as ink density.

As illustrated in FIG. 11 for circle 100, the center 102 of the circle can shift across the diameter As while still remaining acceptable. Such a shift in the center will result in the circumference of the circle shifting within an inner envelope $E_i$ indicated at 104 and an outer envelope $E_a$ indicated at 106. If the inspector determines that the location of the circle within envelopes $E_i$ and $E_a$ are acceptable, then these envelopes present the range of tolerances for the registration of the circle. This range of tolerance is determined, as above, by entering a nominal location in main memory, measuring proofs, inspecting them to determine which are acceptable, and entering acceptable locations in memory to produce ranges.

FIG. 3 illustrates ranges for ink density where amount of ink in an image is determined. In some cases, however, that is not sufficient, as in the case of a high contrast intaglio line, where a slight deviation might shift the ink density from a high value to zero. This would give an error signal, yet the image might in fact be acceptable.

The method of FIGS. 11–14 takes into account the problem of registration, or image location, for quality judging by providing a grey value, i.e., an average ink density obtained by reason of the presence of a line within the acceptable location range, and comparing the measured image with the grey value. An acceptable image is present, according to the invention, if the average measured density value over the entire range equals the grey value. Such a measurement indicates the presence of the image line. If there is no image line within the desired image location, the average measured value will be below that stored in the master memory. Similarly, if the ink density of the line is less than the acceptable range of values, or greater than the acceptable range, the measured value will fall outside the master grey value.

Figure 12:
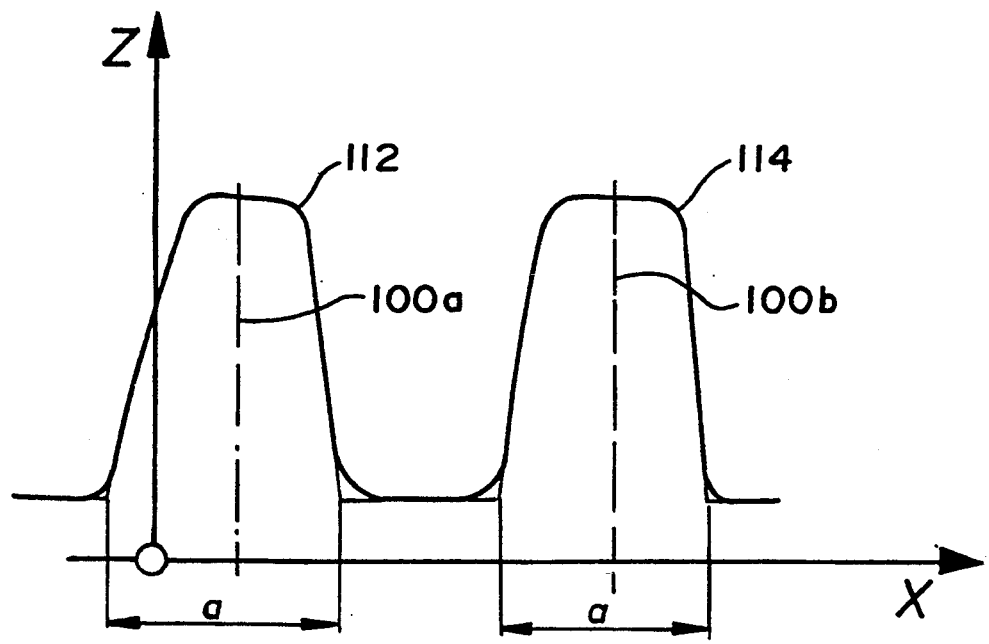
FIG. 12 illustrates the grey value tolerance at cross section A—A of the image of FIG. 11.

FIG. 12 illustrates at 110 a grey value tolerance envelope for the circle 100, taken at the cross-sectional location A—A of FIG. 11. The nominal location of circle 100 is indicated at the dotted lines 100a, 100b in FIG. 12, with the Z axis representing the ink density of the image. A line 100 at its nominal position would indicate high-density patterns at locations 100a and 100b upon scanning the image to be judged at cross-sectional region A—A. The tolerance envelopes for image lines 100a and 100b are indicated by curves 112 and 114, respectively, in FIG. 12, which patterns correspond the tolerance envelope defined by dotted lines 104, 106 in FIG. 11 and provide a range a in which an image must occur to be acceptable.

Figure 13:
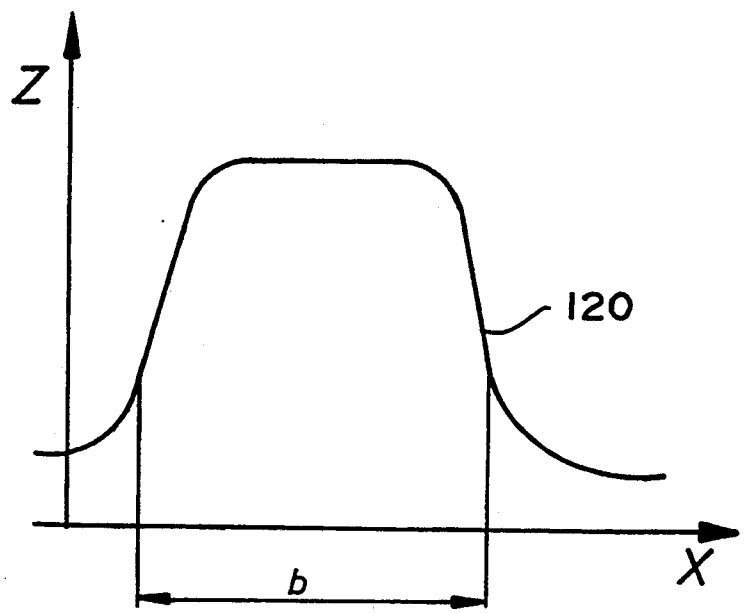
FIG. 13 illustrates the grey value tolerance at cross section B—B of FIG. 11.

The tolerance envelope representing the line 100 at cross-sectional region B—B is illustrated by curve 120 in FIG. 13. A scan line g at section B—B may intersect the line 100 at any X location within the range indicated by curve 120. The line g intersects line 100 between envelopes 104 and 106, and it is in this area "b" of FIG. 13 where a printed contrast intensive line, such as an intaglio line, is expected for the acceptable printed intaglio image.

Figure 14:
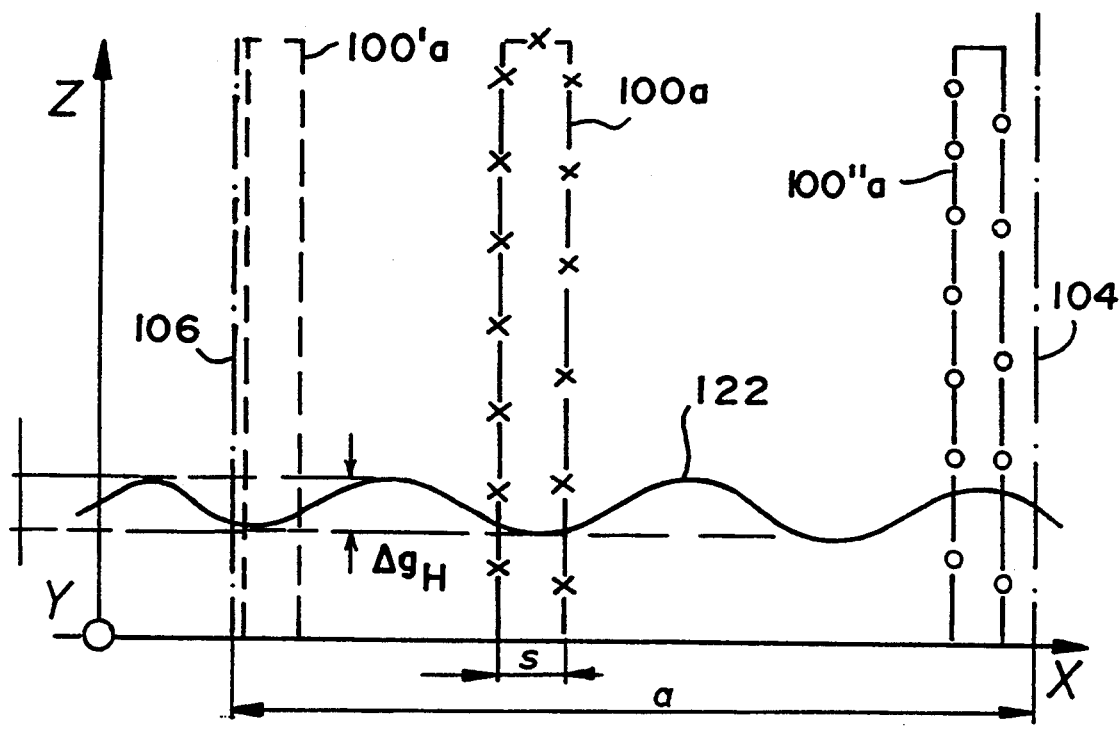
FIG. 14 is an enlarged view of a portion of the grey value tolerance graph of FIG. 12, showing three possible positions of the line of FIG. 11 within the tolerance range.

FIG. 14 is an enlarged view of the area "a" of FIG. 12, showing three possible locations for the line 100a between the outer and the inner envelopes 106 and 104. If the portion of the line 100 at 100a is in its nominal position, it will normally be approximately centered between envelopes 104 and 106. Acceptable positions to the left or right of the nominal position 100a are illustrated at 100a' and 100a", respectively in FIG. 12.

The grey value for cross-section A—A, or average ink density across the envelope (between envelopes 106 and 104), for line 100a is illustrated by line 122, which is the image carrier background level averaged with the ink density of the line 100 across the line width S. This grey value will be within a small tolerance range for all tested image samples which include the line 100 (for example) within the locations defined by envelope "a". The acceptable range of ink densities for the line 100 also allows a variance of the grey value, with the maximal allowed variations being:

$$\frac{(\Delta g_H)(S)}{a}$$

where $\Delta g_H$ is the grey value tolerance.

Deviations from the acceptable grey value may indicate that there is not enough contrast due to a missing contrast line 100, for example, or a discontinuous printed line where the measured grey value will be less than the value stored in the main memory, or, for example, may indicate there is too much contrast due to a heavy print, in which case the measured grey value will be more than the stored value.

The selected areas of measurements, or image elements (pixels) for the embodiment of FIGS. 11–14 may be larger than the pixels of FIGS. 1–10, or may include a number of small pixels in order to determine the printing pattern and threshold values for comparison between a measured value and a stored nominal value for the same image element.

The tolerance ranges are established in the manner described with respect to FIGS. 4 and 6, with an error signal being produced during comparisons when the variance limit has been either exceeded or not reached. When the permissible variance limit is large, there is less sensitivity to deviations from the nominal value.

The system of FIGS. 11–14 thus is able to measure printed images such as high contrast intaglio lines to determine whether they are located within position envelopes. This is accomplished by measuring the average value and the variance from that average over suitable areas of the printed sheet. This is done in such a way that for each image element a variance and an average value are coordinated, with the upper and lower limits being determined by the extreme values of acceptable sample, or proof, sheets.

Although the invention has been described in terms of preferred embodiments, it will be apparent that variations and modifications may be made without departing from the true spirit and scope thereof, as set forth in the following claims.

What is claimed is:

1. A procedure for judging the quality of printed images printed on a printing carrier, by means of an opto-electronic exposure device and a reference information storing device for memorizing image information in high contrast image elements of a printed image, characterized in that a printed image is divided into a multitude of image elements of a size to be chosen, and that to each of these individual image elements is coordinated an individual, reference grey value within an envelope of image locations, and an individual, allowable reference ink density value variation to provide an allowable grey value tolerance in each image element.

2. The procedure according to claim 1, characterized in that the allowable grey value tolerances of the image elements can be amended to provide subjective tolerance levels.

3. The procedure according to claim 1, characterized in that image elements of printed images which have grey values outside the allowable grey value tolerances are identified by error signals.

4. The procedure according to claim 1, characterized in that printed images containing image elements having grey values outside the allowable grey value tolerances are provided with an identification mark for easily identifying the location of such image elements.

5. The procedure according to claim 2, characterized in that image elements of printed images having grey values outside the allowable grey value tolerances are identified by error signals.

6. The procedure according to claim 2, characterized in that printed images containing image elements having grey values outside the allowable grey value tolerances are provided with an identification mark for easily identifying the location of such image elements.

7. A process for quality control of an image, comprising:
defining within a printed image to be inspected a plurality of individual image elements, each element encompassing an image pattern;
storing a master printed image incorporating said plurality of individual image elements, the stored master image including for each image element a stored nominal pattern value;
storing an acceptable tolerance range for each image element nominal pattern value to provide minimum and maximum allowable pattern values for each said image element;
measuring individual image elements of a printed image to obtain individual measured pattern values; and
comparing said individual measured pattern values with corresponding allowable maximum and minimum stored pattern values to determine errors in said printed image.

8. The process of claim 7, wherein the step of storing a master printed image includes storing nominal ink density variations within each said image element.

9. The process of claim 7, wherein the step of storing a master printed image includes storing an average density grey value for each said image element.

10. The process of claim 7, wherein the step of storing a master printed image includes storing nominal image location values within each said image element.

11. The process of claim 10, wherein the step of storing a tolerance range includes storing a range of acceptable image location values.

12. The process of claim 11, further including determining a grey value for each said image element, said grey value indicating the presence of an image pattern within said range of acceptable image location values.

13. The process of claim 11, wherein the step of storing a tolerance range further includes storing a range of acceptable ink density values.

14. The process of claim 13, further including determining a grey value for each said image element, said grey value indicating an image pattern having an average ink density within said range allowable pattern values.

15. The process of claim 14, wherein the step of determining a grey value for each said image element further indicates the presence of an image pattern within said range of acceptable image location values.

16. The process of claim 7, wherein the step of storing an acceptable tolerance range includes:
scanning a plurality of proof images to measure pattern values for each image element of each proof image;
selecting proof images judged to have acceptable register and ink density in all its image elements; and
storing measured pattern values for each image element of each selected proof image.

17. A procedure for carrying out quality control of an image copy comprising:
determining a nominal grey value representing ink density and image location within each of a plurality of image elements in an image; and
determining from a plurality of acceptable proof copies an acceptable tolerance range for each said nominal grey value.

18. The procedure of claim 17, further including determining from said plurality of acceptable proof copies maximum and minimum acceptable variations from said nominal grey value.

* * * * *